United States Patent [19]

Winkle et al.

[11] 3,971,537

[45] July 27, 1976

[54] ADJUSTABLE TRACK MOUNTING DEVICE IN RAIL SYSTEM FOR MAGNETIC-SUSPENSION VEHICLES

[75] Inventors: Günther Winkle, Munich; Peter Schwärzler, Fürstenfeldbruck; Peter H. Otto, Munich; Peter Mölzer, Hebertshausen; Christian Walkner, Dachau, all of Germany

[73] Assignee: Krauss-Maffei Aktingesellschaft, Munich, Germany

[22] Filed: Mar. 27, 1974

[21] Appl. No.: 455,323

Related U.S. Application Data

[62] Division of Ser. No. 378,966, July 13, 1973, Pat. No. 3,882,790.

[30] Foreign Application Priority Data

July 17, 1972 Germany.............................. 2335036
Jan. 25, 1973 Germany.............................. 2303552

[52] U.S. Cl. ................................. 248/23; 248/188.4
[51] Int. Cl.² ....................... F16M 5/00; F16M 3/00
[58] Field of Search .......... 248/23, 276, 180, 188.2, 248/188.4; 254/101; 248/25, 357

[56] References Cited
UNITED STATES PATENTS

| | | |
|---|---|---|
| 1,373,708 | 4/1921 | Blume.................................. 248/23 |
| 1,682,472 | 8/1928 | Baumberger et al........... 248/23 UX |
| 2,940,784 | 6/1960 | Fell................................. 248/23 UX |
| 3,216,678 | 11/1965 | Foedisch........................... 248/23 X |
| 3,361,410 | 1/1968 | Messer................................. 254/101 |

*Primary Examiner*—J. Franklin Foss
*Attorney, Agent, or Firm*—Karl F. Ross; Herbert Dubno

[57] ABSTRACT

A magnetic-suspension or levitation vehicle comprises a track having a plurality of substantially continuous rails cooperating with respective systems upon the vehicle, e.g. a reaction rail cooperating with a linear induction motor, a contact rail cooperating with shoes for delivering current to or electrically connecting the vehicle to a central station, an armature rail for a magnetic suspension and/or guide arrangement etc.; at least two and preferably all of the rails are mounted upon common supports which, in turn, are anchored to the track structure at spaced locations along the vehicle path. Thus the relative position of the rails can be established in a factory and the prefabricated rail assembly erected at the track site as a unit.

1 Claim, 20 Drawing Figures

ADJUSTABLE TRACK MOUNTING DEVICE IN RAIL SYSTEM FOR MAGNETIC-SUSPENSION VEHICLES

CROSS-REFERENCE TO RELATED APPLICATIONS

This is a division of application Ser. No. 378,966, filed July 13, 1973, now U.S. Pat. No. 3,882,790.

The present application is related to the following commonly assigned copending applications filed by one or more of the present applicants alone or with others and disclosing various details of a magnetic-levitation system for vehicles. These applications include applications Ser. No. 268,133 filed June 3, 1972, Ser. No. 280,073 filed Aug. 11, 1972, and Ser. No. 280,074 filed Aug. 11, 1972 (now U.S. Pat. No. 3,842,748), all of which deal with electromagnetic suspension and lateral guide systems for such vehicles; applications Ser. No. 292,173 filed Sept. 25, 1972 and Ser. No. 292,638 filed Sept. 27, 1972, both of which deal with contact-rail assemblies for providing electrical communication between such a vehicle and the track; application Ser. No. 297,035 filed Oct. 4, 1972 (now U.S. Pat. No. 3,865,043) which describes sensing arrangements for maintaining a predetermined gap between the armature rails and the magnetic suspension and guide systems; application Ser. No. 324,150 filed Jan. 16, 1973 and dealing with linear induction motors for propelling such vehicles; and applications Ser. No. 324,131 (U.S. Pat. No. 3,850,108), Ser. No. 324,135 (U.S. Pat. No. 3,842,747) and Ser. No. 324,151 (U.S. Pat. No. 3,842,749), all filed Jan. 16, 1973 and dealing with magnetic-suspension track systems in general.

FIELD OF THE INVENTION

The present invention relates to a rail system for a magnetic-suspension or levitation vehicle and, more particularly, to improvements in the arrangements of the continuous rails of such systems and the track structure.

BACKGROUND OF THE INVENTION

As described in the aforementioned copending applications in general terms or specifically, recent requirements for urban, intraurban or interurban transport in a manner which does not significantly affect the environment, have directed considerable attention to high-speed vehicle systems in which a vehicle is displaced along a track. It has long been a problem in vehicle-and-track systems that the speed of a wheeled vehicle is limiited by friction, both at the location at which the wheel engages the track and at the location at which the wheel is journaled on the vehicle.

In addition to frictional losses and limitations, the direct mechanical support systems using wheels and the like are highly susceptible to wear and breakdown. Hence attention has focussed upon levitation-type vehicles in which frictional engagement between the track and the vehicle is minimized or eliminated altogether. A magnetic-suspension vehicle of the type with which the present invention is concerned, may comprise a vehicle body provided with two or more longitudinally extending rows of electromagnets which cooperate with respective armature rails extending continuously along the track so that a magnetic attraction force is generated between the electromagnet core and the armature rails by means of which the vehicle is suspended from the track while a gap is maintained between the armature rail and the suspension electromagnets.

To prevent or limit lateral dislocation of the vehicle, the suspension electromagnets may, as described in some of the aforementioned copending applications, be so energized and shaped that a lateral stabilization force component is provided, or the vehicle may be provided with lateral-guide electromagnets which cooperate with lateral armature rails on the track structure to maintain a substantially constant gap in the lateral direction. The latter electromagnets must counteract wind forces and centrifugal forces which arise as the vehicle negotiates curves or turns.

Since the vehicle is generally electrically powered, it must be provided with electricity to energize the electromagnetic suspension or guide arrangements, it may require electrical interior or exterior illumination, and it may be connected by a communication system to a central station. It is desirable to provide along the track a plurality of contract rails which are engaged by roller or sliding shoes on the vehicle to effect electrical communication between the vehicle and the track.

In addition, the vehicle may be powered by a linear induction motor which cooperates with a reaction rail mounted along the track and straddled by the windings of the linear induction motor.

Finally, it has been found to be advantageous to provide continuous rail-like surfaces on the track engageable by, but normally spaced from juxtaposed surfaces of the vehicle so that the latter may be supported against failure of the electromagnetic suspension and guide systems in an emergency.

Thus it is not uncommon for the track to be provided at both sides or at each side of the vehicle with an armature rail for suspension or guide purposes, a reaction rail cooperating with the linear induction motor, one or more contact rails for electrical communication between the track and the vehicle, etc. In general, the track structure has been a channel-shaped member into which the lower part of the vehicle extended, or a central beam member straddled by the underside of the vehicle, the beam or channel being provided on its flanks with lateral guide and contact rails, on downwardly facing surfaces with magnetic-suspension armature rails and, either on edge or in a prone position, a reaction rail for the linear induction motor.

All of these rails were generally mounted upon the support individually and required individual adjustment and positioning. This made assembly of the track structure difficult, expensive and time-consuming, and frequently required readjustment at closely spaced intervals because of the criticality of the positions of the rail vis-a-vis the vehicle and the positions of the rails relative to one another.

OBJECTS OF THE INVENTION

It is the principal object of the present invention to provide an improved track assembly for a magnetic-suspension or levitation-type vehicle which eliminates the aforedescribed disadvantages and greatly simplifies the mounting of the various rail sections.

It is another object of the invention to provide an arrangement of the track components of a suspension vehicle to permit an exact and simple mounting and adjustment thereof.

Still another object of the invention is to provide a rail-mounting arrangement for suspension vehicle systems as described in the above-mentioned copending applications and, therefore, to further extend the principles set forth in these applications.

SUMMARY OF THE INVENTION

These objects and others which will become apparent hereinafter are attained, by providing the system components on both sides of the track upon common supports and preferably rail-mounting members extending in convenient lengths along the track, for connection thereby to the track structure at spaced-apart locations along the path of the vehicle. The significant advantage of this arrangement is that the connecting rail or mounting members allow the system (active) rails to be positioned accurately with reference to one another in a factory and to be preassembled in readily manipulated lengths which only require attachment to the track structure and electrical connection in end to end relationship at the track site. The prefabrication of the rail assemblies, by mounting the individual rails upon a common support, has been found to greatly simplify and economize the work of erecting the rails upon the track structure since the efforts at the track site are limited to the mounting of the entire assembly upon the support member and is free from concern for exact positioning of the individual rails. Furthermore, the mounting means is capable of adjustable positioning on the track support so that, in the event of settling of the foundations of the latter, a repositioning of the individual rails requires little effort since all that is required is adjustment of the railmounting members as will be apparent hereinafter.

The system of the present invention thus comprises a track and a vehicle displaceable along a path on this track, the vehicle including at least two of the following elements (a – e):

a. electric-motor means for propelling the vehicle along the track,
b. electromagnetic-suspension means for magnetically supporting the vehicle on this track,
c. electromagnetic guide means for lateral positioning the vehicle relative to the track,
d. contact-shoe means for effecting an electrical connection between the track and the vehicle, and
e. emergency support means engageable with the track upon failure of the electromagnetic-suspension means.

Each of these elements (a – e) will generally be provided with a rail member mounted on the track and, since some of the elements may cooperate and use a single rail member, at least two rail members must be used in accordance with the principles of the present invention. The two rail members, respectively cooperating with the vehicle elements, are secured upon common mounting elements which, in turn, are anchored to the track support at least at spaced-apart locations therealong. The mounting elements may be brackets lying in vertical planes and having a number of rails secured to them and extending in the horizontal direction, the mounting brackets and rail members collectively forming the rail assembly which is anchored to the support. The rail assembly may also comprise a continuous support (passive) rail lying in a vertical or horizontal plane and carrying the rail members which cooperate with the vehicle elements so that the support rail and active rail members collectively form the rail assembly which is prefabricated in a factory or workshop in convenient lengths (of the order of meters), carried to the track site and mounted upon the concrete track bed.

It has been found to be advantageous to have the rail assembly include all of the rails cooperating with the aforementioned vehicle elements (a – e) and to impart an angle or channel configuration to the rail assembly so as to increase its stiffness and at least partially enclose the active rail members against the effect of the weather.

It will be apparent that the aforedescribed system, using mounting elements to hold the individual active rails together in an assembly, requires fewer points of connection of the rails to the track structure and hence reduces the cost thereof. In addition, when one of the rails is the reaction rail of the linear induction motor, separate brackets for this rail can be eliminated. The assembly of the individual track system component to a compact rail assembly allows the complementary components of the vehicle to be located in a compact manner and thereby decreases both vehicle size and vehicle weight.

The electric motor means (element $a$) is preferably a linear induction motor of the type described in application Ser. No. 324,150 filed Jan. 16, 1973, in which the coils straddle the reaction rail which lies horizontally or is disposed on edge.

the electromagnetic-suspension means (element $b$) may be provided independently of the electromagentic guide means (element $c$) or in a single unit therewith and a construction of the type set forth in applications Ser. Nos. 268,133, 280,073 or 280,074, identified earlier, is preferred.

The contact rails and shoe arrangements (element $d$) may be those described in applications Ser. Nos. 292,173 and 292,638 mentioned earlier.

Advantageously, the rail assembly of the present invention comprises at least one armature rail cooperating with the electromagnetic suspension and guide systems, at least one reaction rail cooperating with the linear induction motor, at least one current-carrying rail for electrical communication between the track and the vehicle, and at least one rail portion adapted to serve as an emergency support for the vehicle. Additional rails, of course, may also be provided as required and mention may be made of electrical control and communication rails, additional current-supply rails and further reaction or armature rails. All of the latter rails are referred to generically herein as "active rail members."

According to another aspect of the invention, the mounting elements, e.g. brackets, are provided with formations for precise positioning of the active rail members to be applied thereto and are adjustably mounted upon the support of the track. In this case the active rail members may be applied to the brackets after they have been placed upon the support (before or after adjustment) without requiring further positioning or careful readjustment.

According to another feature of the invention, the rail assemblies comprise brackets which are disposed at spaced-apart locations along each assembly and are adjustably anchored to the track support structure. Preferably, the brackets comprise T-shaped members having shanks lying along vertical flanks of the beam and a T-bar overhanging a recess or step therein, the faces of the T being formed with seats upon which the rails may be mounted, preferably without adjustment. For example, each of these seats can be provided with one or more formations engaging the respective active rail member so as to positively position it whereby all of the active rail members are atuomatically positioned with respect to one another when they engage the respective seats.

The bracket may be formed with lugs having slots extending perpendicular to the longitudinal direction of the track and including a pair of lugs straddling the crossbar of the T and two pairs of lugs spaced one above the other on either side of the shank. The means for adjustably anchoring the lugs to the support can include a nut embedded in the concrete of the support, a variable-length spacer arrangement between the lug and the support and preferably consisting of two threadedly engaged sleeves coaxial with the nut and a bolt traversing the slot of the lug and threaded into the nut for clamping the lug against the sleeve.

Advantageously, between the sleeve and the nut or support and/or between the lug and the sleeve and/or between the head of the bolt and the lug, there are provided a pair of slidably engaging spheroidal seats which permit pivotal positioning of the lug with two degrees of freedom relative to the support and the nut. Lateral positioning in a direction perpendicular to the major dimension of the slot may also be permitted by appropriate dimensioning of the latter, e.g. to make the width of the slot greater than the diameter of the bolt traversing same. At least one of the threadedly interconnected sleeve members is provided with a formation engageable with the member (support or lug) against which it is seated for preventing rotation of the sleeve while the other is rotated to extend or contract the spacer.

According to another aspect of the invention, two or more active rail members are mounted upon longitudinally spaced transversely extending brackets which are individually anchored to upwardly facing surfaces of the track support structure. Thus the brackets may be profile members which extend perpendicular to the longitudinal direction of the track but parallel to the track plane and hence cantilever the rail or rails which they support. The brackets are bolted to the support and the gap between the bracket and the support, serving for adjustment, may be filled with a force-transmitting incompressible mortar or by an adjusting device of the type described. When it is necessary to readjust the position of the bracket, of course, the mortar is simply broken away, the adjustment is effected, and the gap refilled with mortar.

According to another feature of the invention, the profile brackets are composed of iron or steel and have a double-T cross-section, the rail members being welded to the free ends of the brackets. Any rail member directly mounted on the bracket, of course, can also provide a mounting surface to which another rail member is attached.

The profile brackets may extend through a central hollow beam support so as to project from opposite sides thereof and can carry respective rail members on these opposite sides. It is advantageous in this embodiment to provide a body of mortar between the upper limb of the bracket and the upper wall of the beam in addition to the mortar at the adjustment gaps between the support surface and the bracket portion bolted thereto. In this case, the bracket is substantially completely enclosed and aerodynamic effects of the brackets are eliminated, vibration of the bracket is reduced and the system in general is particularly suited for high-speed vehicle operation.

It has been found to be desirable to provide an anchor plate rigidly embedded in the support structure and to provide the mortar between the anchor plate and the underside of the bracket which is traversed by an adjusting bolt. On the underside of the anchor plate, a cap nut is provided.

DESCRIPTION OF THE DRAWING

The above and other objects, features and advantages of the present invention will become more readily apparent from the following description, reference being made to the accompanying drawing in which.

SPECIFIC DESCRIPTION

In the description below, reference will be made to armature rails and electromagnetic suspension and guide arrangements to reaction rails and linear induction motors, to contact rails and shoe assemblies, etc., which are only described herein insofar as the description suffices for an understanding of the present improvement. These systems have been described individually in considerable detail in the above mentioned copending applications which, as to these individual components, are hereby included by reference.

In general, mgnetic suspension vehicles are of two types, i.e. those which use a channel-shaped track (FIGS. 1 through 9) in which the undercarriage of the vehicle is received in the channel, and those which use a central beam (FIGS. 10 and 11) straddled by the undercarriage of the vehicle. In the former case, the rail assembly to be described will generally have its active rail members extending inwardly from the outer walls of the channel and the beams provided on the upper edges thereof. To cooperate with the active rail members, the vehicle will have on each flank a laterally open assembly cooperating with the inwardly oriented rail arrangements. In the central beam configuration, however, the rail assemblies will be mounted on the outer flanks of the beam and the vehicle will have inwardly directed systems to cooperate with the rails. In any event, all of the structures described for use with the channel-shaped track is equally applicable when applied to the outer flank of a central beam and all of the structures described as applicable to a central beam herein, equally adapted to be mounted along the inner flank of the channel track.

Figure 1:
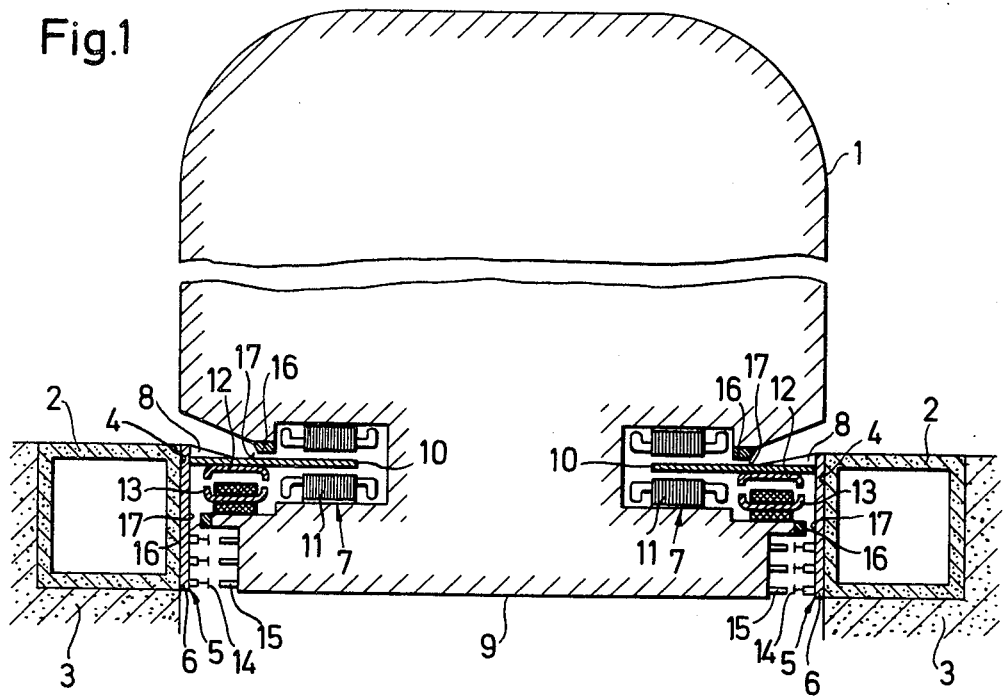
FIG. 1 is a diagrammatic vertical cross-section through a suspension vehicle system embodying the present invention.
Figure 1A:
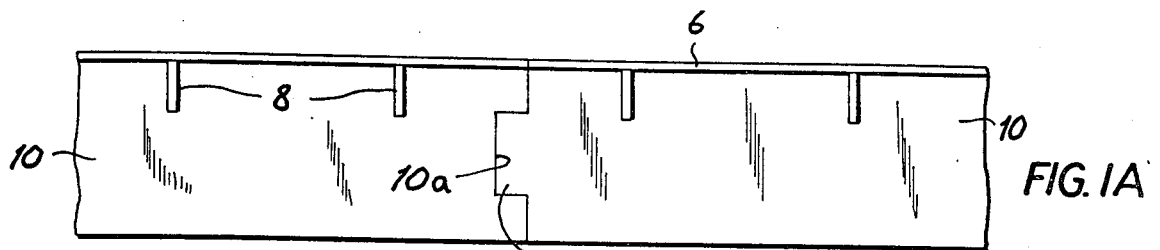
FIG. 1A is a plan view of the rail assembly of the system of FIG. 1.
Figure 1B:
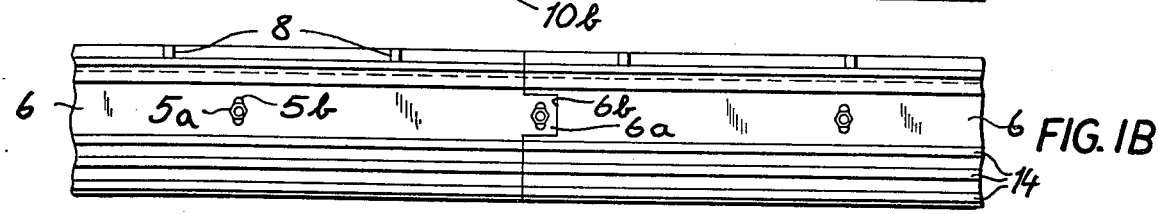
FIG. 1B is a side-elevational view of this assembly.
Figure 1C:
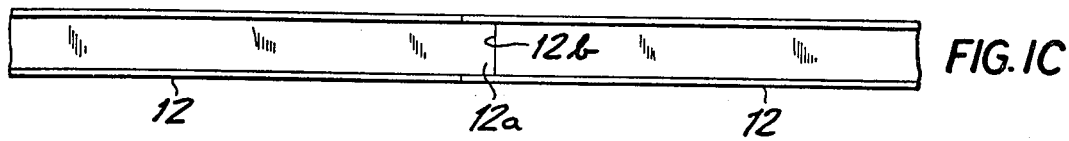
FIG. 1C is a detail view of the armature rail of the latter system as seen from below.
Figures 1D, 1E, 1F:
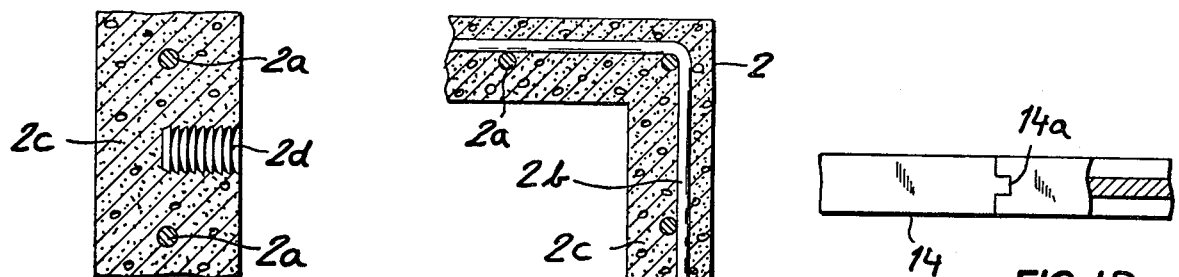
FIG. 1D is a side-elevational view of the junction region of a contact rail of the assembly of FIGS. 1A and 1B, partly broken away.
FIG. 1E is a detail cross-section of a portion of the concrete beam upon which the rail assembly is mounted.
FIG. 1F is a cross-sectional detail view showing an anchor for mounting the rail assembly to this beam.

The vehicle system shown in FIG. 1 comprises a magnetic-suspension vehicle 1 and a track defined by a pair of hollow parallel rail-support beams 2 of reinforced concrete which spans the upright or pylon structure 3. The latter may also be composed of reinforced concrete. As FIG. 1E demonstrates, the beam 2 may be provided with longitudinal reinforcing rods 2a and frame-like transverse reinforcing rods 2b embedded in a body of concrete 2c. The longitudinal reinforcing rods in FIG. 1F are likewise represented at 2a and a lead anchor or other expansion device 2d is shown to be embedded in the concrete 2c thereof.

To the lateral flank 4 of the support beams 2 are secured the rail assembly generally designated at 5. To this end bolts 5a (FIG. 1B) receivable in anchors 2d may be employed. For positioning the rail assembly, slits 5b may be provided in the support rail 6 to which all of the active remaining members are secured.

In the embodiment illustrated in FIG. 1, all of the active rail members are system rails mounted upon the continuous plate which constitutes the support rail 6 and the latter has a length equal to the length of the rail assembly.

With vehicle 1 is provided on its undercarriage 9 with a linear induction motor 7 of the double-sided type, the stator stacks 11 here being disposed above and below a reaction rail 10 of electrical conductive metal (e.g. copper or aluminum). For the details of such a linear induction motor reference may be had to application of the Ser. No. 324,150 (U.S. Pat. No. 3,820,472). Along the outer edges of the reaction rail 10, they are welded to the upper portion of the vertical support rails 6 and are stiffened relative thereto by triangular webs 8 which lie in vertical planes spaced apart along the rails (see FIGS. 1, 1A and 1B) the reaction rail here extends horizontally between the stator stacks 11 of the linear induction motor.

Between the active free ends of the reaction rails 10 and their anchored portions, there is provided on the underside of each reaciton rail a downwardly open channel-shaped armature rail of U-profile 12 of magnetically attractable material and forming part of the magnetic suspension and guide systems. The operation of the latter will be apparent from applications Ser. No. 268,133 (U.S. Pat. No. 3,797,403), Ser. No. 280,073 (U.S. Pat. No. 3,780,668), or Ser. No. 280,074 (U.S. Pat. No. 3,842,748). In accordance with the principles described in these applications, the undercarriage 9 of the vehicle is provided with outwardly extending ledges having upwardly facing surfaces upon which are mounted rows of electromagnets 13 whose cores have profiles corresponding to that of the juxtaposed armature 12 so that the poles of the armature rails 12 are aligned with the poles of the electromagnetic cores.

Along the bottom of the support rail 6, there are provided three current-carrying rails 14 which cooperate with diagrammatically illustrated contact shoes 15 on the vehicle. The rails may be of the type described in application Ser. No. 292,173.

To support the vehicle against failure of the electromagnetic suspension or guide forces, e.g. if the electric current supply fails, the rail assembly 6, 8, 10, 12, 14 is provided with longitudinally extending zones or rails 17 which are engageable by the emergency rails 16 of the vehicle. The emergency rails of the vehicle may be formed as blocking surfaces which, upon contact with the rail surfaces 17, frictionally slow the vehicle. Of course, some of the contact rails 14 on one or both sides can be used for communication and control signals or additional contact rails may be provided for this purpose. The rail assemblies are prefabricated in a factory or workshop in unit lengths of several meters which are readily transportable and easy to handle. The rail assemblies are then mounted upon support 2 at the track site. For alignment and effective electrical connection of the length of rail assembly, a dovetail or tongue-and-groove arrangement may be provided. In each assembly, the reaction rail 10 (FIG. 1A) is formed at one end with a notch 10a and at its other end with a tongue 10b receivable in the notch 10a of the preceding section. This ensures proper alignment of the reaction rail components. In form FIG. 1B it can be seen that the support rail 6 likewise may have a tongue 6a at one end engaging in a notch 6b at its other end. So too the armature rail 12 may be formed with a tongue 12 a adapted to fit into an open-end recess 12b of the next armature rail section. Even the contact rails 14 may have a tongue and recess arrangement at 14a to insure proper alignment.

Figure 5A:
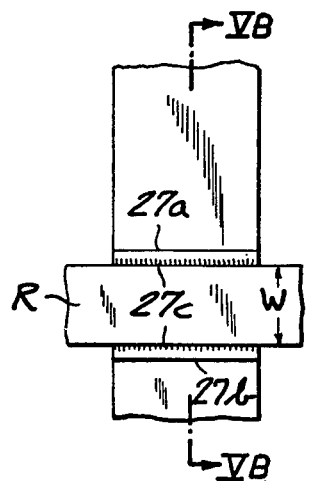
FIG. 5A is a detail view showing a positioning formation which can be used with the bracket of FIG. 5.
Figure 5B:
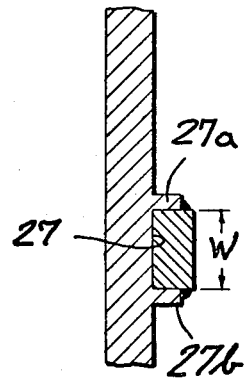
FIG. 5B is a cross-sectional view taken along the line VB — VB of FIG. 5A.

Of course, the support rail 6 may be provided in sections of smaller lengths at spaced locations along the support 2 and may be adjustably mounted thereon, e.g. via the screw and slit arrangement 5a, 5b, while being formed with seats for the active rail members and provided with formations for positively positioning them relative to one another. Such positioning means has been described in connection with FIGS. 5A and 5B. In this case, the support rail members 6 are mounted and positioned upon the support 2 and the active rail members 10, 12, 14 are then applied at their predetermined positions without mutual adjustment.

The right-angle junction of the reaction rail 10 with the support plate 6 provides an angle profile for the rail assembly which thus has relatively high stiffness and shields the pole faces of the armature rail 12 and the contact faces of the contact rails 14 against the effect of the weather. Furthermore, since the rail assembly is laterally open, the lateral withdrawal from the rail assembly is possible, e.g. when the vehicle is to be directed along a branch rail as described in connection with applications Ser. Nos. 324,131, 324,135 and 324,151. Such lateral withdrawal is also advantageous when narrow or tight curves are to be negotiated by the vehicle.

Figure 2:
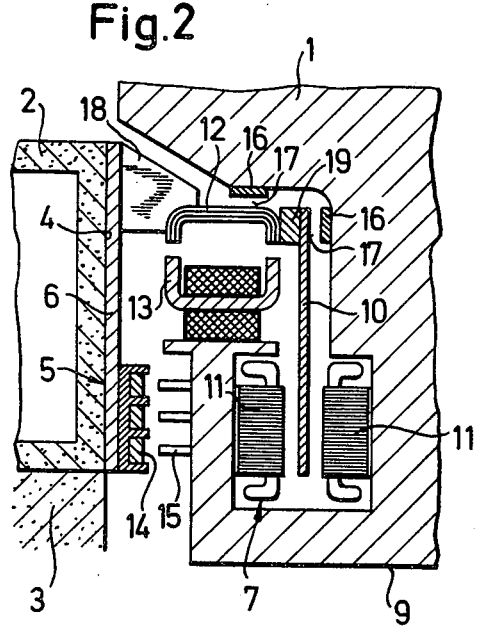
FIG. 2 is a diagrammatic cross-sectional view of a rail assembly for another magnetic suspension vehicle and representing an embodiment of the invention in which the reaction rail is positioned on edge, i.e. in a vertical plane.

FIG. 2 shows another embodiment of the present invention and in this FIGURE and in the FIGURES which follow, the same reference numerals will be used to indicate functionally identical parts. In this embodiment, the rail assembly 5 is mounted upon a lateral face of the support beam 2 of the track which also comprises a plurality of spaced-aprt uprights supporting the beam 2.

The support rail 6 of the assembly has brackets 18 lying in vertcial planes and transversely spaced apart along the support rail 6 but welded to the magnetic-suspension and lateral-guide armature rail 12. The latter is formed at its free edge with spacers 16 and a reaction rail 10 disposed on edge in a vertical plane parallel to the plane of plate 6. The requisite electromagnets 13 and stator assemblies 11 of the linear induction motor 7 are here provided on the undercarriage 9 of the vehicle in juxtaposition with the respective rail. Along the bottom of the support rail 6, there is provided an electrically insulating bed in which the contact rails 14 are mounted.

The embodiment of FIG. 2 imparts a U-configuration to the rail assembly 6, 12, 10 and further increases the rigidity thereof while providing the active rail members with protection from the environment. In this embodiment, the emergencry rail 16 is juxtaposed with a rail surface 17 formed by the armature rail 12.

Figure 3:
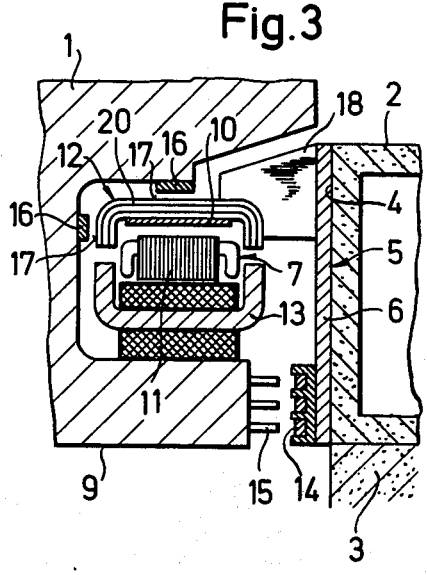
FIG. 3 is a view similar to FIG. 2 showing the rail assembly on one side of the system in which the reaction rail, armature rail and emergency support rail portions are formed in a single rail body.

A more compact structure has been illustrated in FIG. 3 in which the armature rail 12 is mounted on the brackets 18 of the support rail 6 and has a base or web 20 along which lies an electrically conductive reaction rail 10 cooperating with a one-sided linear induction motor 7 whose stator stack 11 is disposed between the arms of the core of the electromagnet 13 providing the suspension forces. The emergency rail 16 is here juxtaposed with the base or web of the armature rail 12. A lateral emergency rail 16 is, in the embodiment of FIG. 2, engageable with the anchored end of the depending reaction rail 10 while, in FIG. 3, it is engageable with the free side of the armature rail 12.

Figure 4:
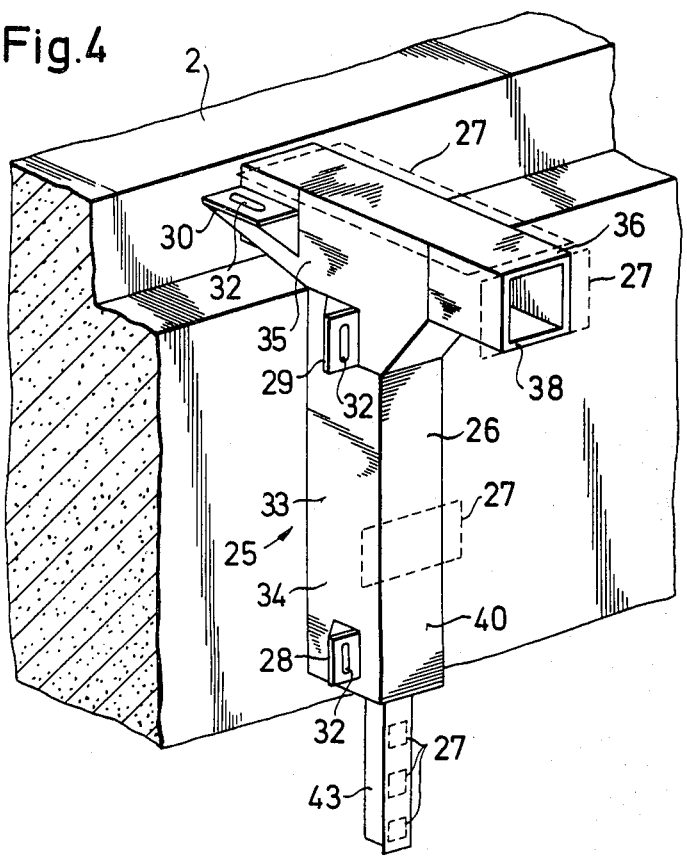
FIG. 4 is a perspective view of a bracket arrangement adapted to be mounted upon a track beam and to carry the several rails, the rail seats being shown diagrammatically.
Figure 5:
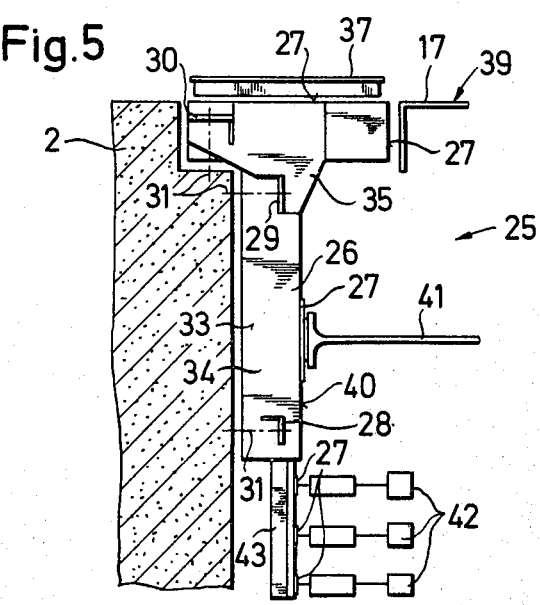
FIG. 5 is a combination bracket seen in side elevational view with the various rails attached thereto.

In FIGS. 4 and 5, there is shown a combination bracket 25 adapted to be used in place of support rail 6 extending the full length of the rail assembly. The combination brackets 25 carry the active rail members and form therewith the rail assembly which is mounted upon the support of the track as represented at 2 in FIGS. 4 and 5.

The combination brackets 25 comprise T-shaped hollow structures 26 which are welded from plates or cast and which are provided with mounting seats 27, accurately positioned with respect to one another, to accommodate the individual active rail members for adjustment-free mounting thereof. To this end, each of the seats 27 may be flanked by a pair of ridges 27a, 27b whose spacing W is exactly equal to the width W of a rail portion R to be received between the ridges. The rail may be welded to the ridges as represented by seams 27c. The formations 27a, 27b are merely illustrative of any exact-positioning means which may be used with the bracket of FIGS. 4 and 5.

The bracket 26 is further provided with fasteneing lugs 28, 29 and 30 which enable mounting of the bracket to the support beam 2. Of course, the rail assembly can be prefabricated in the workshop or factory and carried in convenient lengths to the track site, or the individual brackets may be mounted upon the support 2 at spaced-apart locations, whereupon the active track members are applied. The adjustable positioning of the brackets upon the supports 2 is effected by means of adjusting devices 31 which will be described in greater detail hereinafter.

The anchoring lugs 28 through 30 are provided with slots 32 extending perpendicularly to the longitudinal direction of the track. The lugs are provided on the T-forming surfaces of the combination bracket and only the lugs on one side thereof have been shown. Two such lugs are provided on either side of the horizontal bar 35 of the T and four lugs (two on each side) are provided for the vertical shank 34 thereof.

Of course, a positive support may be provided to resist vertical movement of the bracket in addition to the frictional forces developed by the bolts passing through the lugs and, advantageously, the adjusting devices described below at 31 will fulfill the support requirements. The bending stresses applied to the bracket will, of course, be resisted by the configuration thereof and the orientation of the anchoring bolts.

The arrangement of the individual active rails in the rail assembly may differ in this embodiment from that of FIGS. 1 through 3. In this case, it is preferred to provide a reaction rail 37 upon the upper surface 36 of the cross-bar 35 of the T, and to provide the magnetic suspension and guide rail 39 at the faces of the T cross-bar, the upper surface of this armature rail forming a rail surface 17 engageable by the emergency rail 16 of the vehicle. A further reaction rail 41 for a double-sided linear induction motor can be mounted upon the face 40 of the shank 26 of the bracket while current-carrying rails 42 are mounted upon profile bars 43 extending from the vertical shank of the bracket 26.

Figure 6:
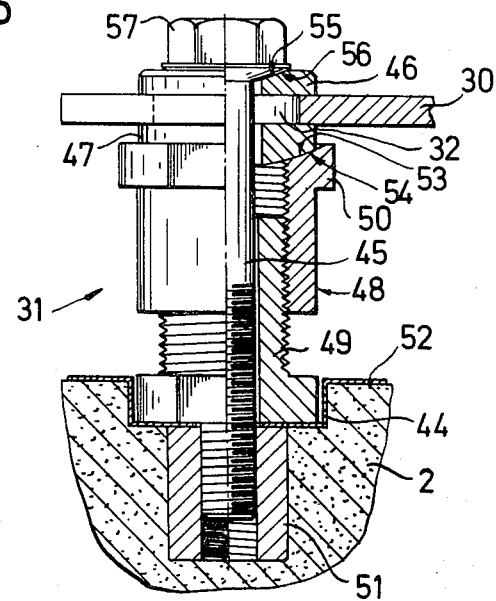
FIG. 6 is a vertical elevational view, partly broken away, showing the adjusting device for the bracket of FIGS. 4 and 5.
Figure 7:
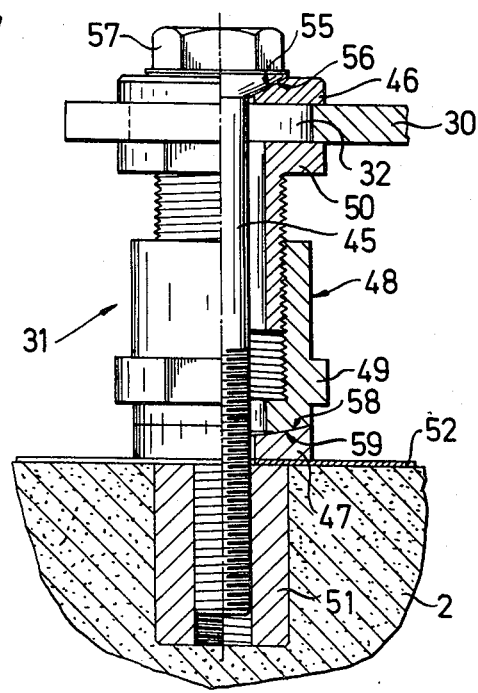
FIG. 7 is a view similar to FIG. 6 showing another embodiment of the adjusting device.

The adjusting device 31 by which the bracket 25 is secured to the beam 2 at the lugs 28, 29 and 30 is shown in detail in FIGS. 6 and 7. The adjusting device comprises a screw 45, a washer 46, a spacer disk 47 and a spacer 48, the latter being composed of two threadedly interconnected sleeves 49 and 50. A locking nut 51 is anchored with a molding cup 52 in the concrete to define a seat for the head of the sleeve 49. When the bottom of the spacer sleeve 48 is fitted into the cup so that is hexagonal head (of threaded member 49) is prevented from rotating, the upper sleeve member 50 can be rotated to take up any slack between the lug 30 and the beam 2. The bolt 57 can then be tightened. The upper end of the sleeve member 50 is formed with a spherical recess 53 which is engageable by the spherical surface 54 of the washer or disk 47 and a similar spherical configuration is provided between washer 46 and the head 47 of the screw at 55, 56. Some pivotal motion of the lug 30 and its spacer disk 47 is possible so that the screw may lock the lug in practically any angular position with two degrees of freedom and against movement by simple tightening of the bolt. The slot in the lug 30 may provide lateral play as well so that some degree of freedom in a plane perpendicular to the plane of the drawing is also possible.

The adjusting device of FIG. 7 differs from that of FIG. 6 only in that the sleeves 49 and 50 define a spherical seat 58, 59 at a disk 47 against the beam 2 and the hexagonal portion of the sleeve 49 must be engaged by a wrench as the adjusting device is screwed to seat the desired length. An abutment may be provided on the lug for engagement with the sleeve portion 50 to prevent rotation thereof.

Figure 8A:
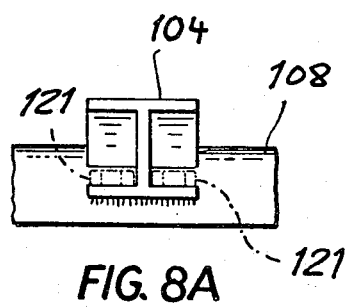
FIG. 8A is an end view of the bracket of this system.
Figure 8:
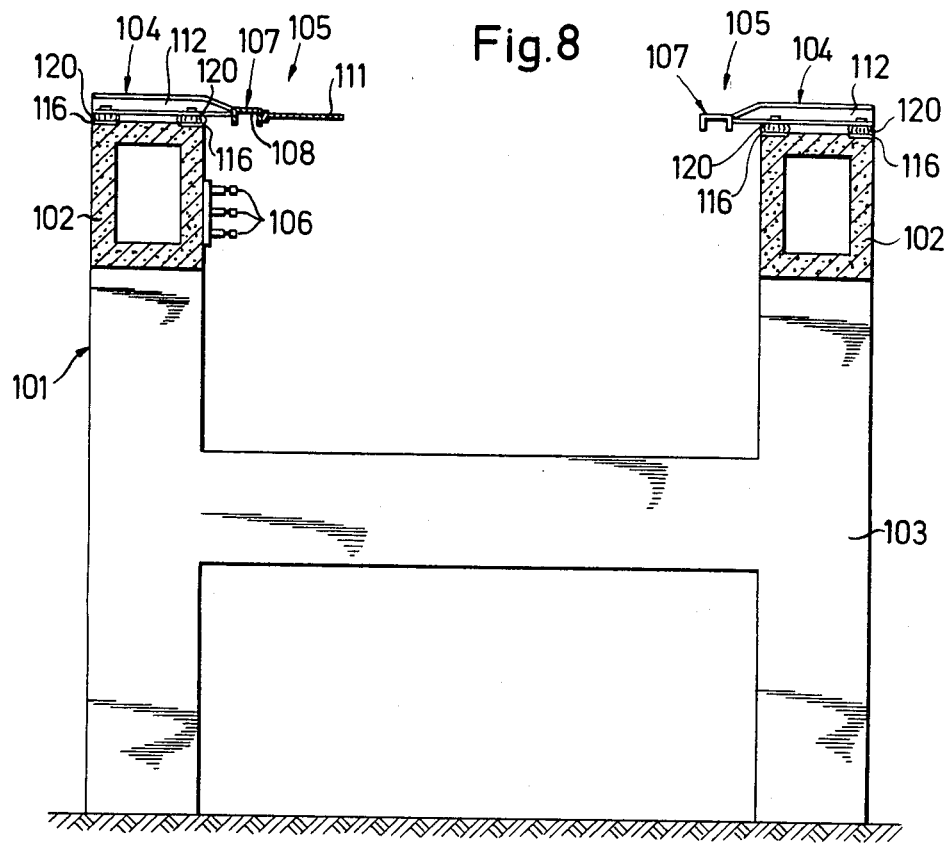
FIG. 8 is a vertical cross-sectional view through a track structure (the vehicle being omitted) illustrating another aspect of the invention.
Figure 9:
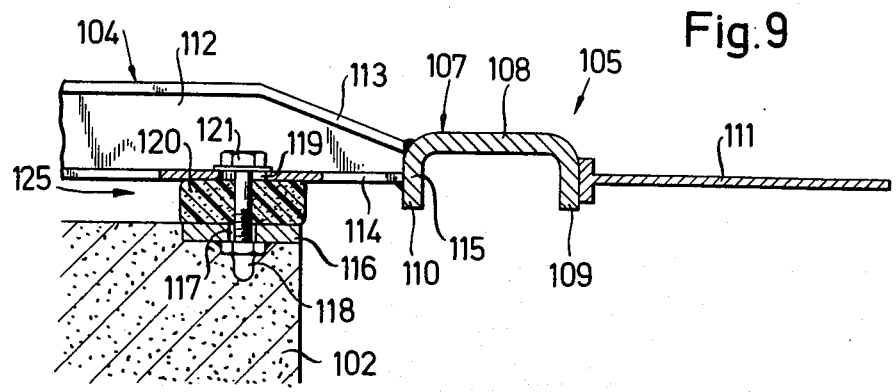
FIG. 9 is a detail of the bracket as seen in the same direction as FIG. 8.

The system illustrated in FIGS. 8 and 8A comprises a track 101 on a magnetic-system vehicle provided with two rows of suspension electromagnets but a double-sided linear induction motor only on the left-hand side thereof as viewed in FIG. 8. The track comprises a pair of support beams 102 of bodies profile and composed of reinforced concrete, the beams being maintained on H-shaped pylons 103 spaced apart in the longitudinal direction.

Along the upper surface of the beams 102, are maintained horizontally extending brackets 104 with a longitudinal spacing of about two meters between them. The brackets are anchored at one end to the beam 102 and project cantilever fashion toward the path of the vehicle from opposite sides of this path. The rail assembly 105 for each side of the vehicle comprises one or more rails mounted in common upon the brackets. Thus, the left-hand bracket may carry the downwardly open channel-shaped armature rail 107 and a reaction rail 111 for the linear induction motor while only a magnetic suspension armature rail 107 is provided on the bracket 104 of the right-hand support 202. The current-carrying rails 106, however, are mounted directly upon the inner wall of the left-hand support beam 102 since adjustment of them is not critical.

As can be seen from FIGS. 1 and 2, the inner ends of the brackets 104 are welded to the vertical shanks of the soft magnet suspension and guide armature rails 107 which have horizontal web 108 and cooperate with rows of upwardly facing electromagnets on the undercarriage of the vehicle (see FIGS. 1, 2 and 3, for example).

The horizontal base or web 108 of the suspension and guide rail 107 also performs the function of an emergency support rail as described above while the shank 109 of the rail 107 of the left-hand support serves to support the reaction rail 111 of high electrical conductivity (e.g. of copper or aluminum).

Figure 10:
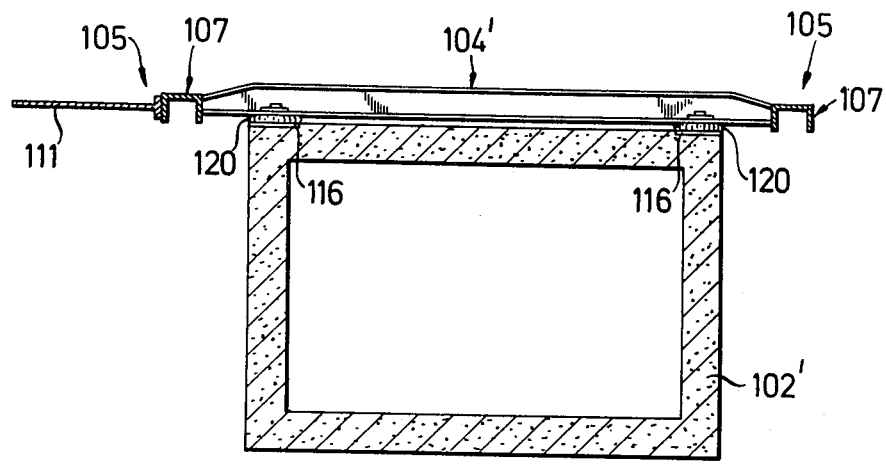
FIG. 10 is a cross-section through a track of the central-beam type adapted to be straddled by the vehicle.
Figure 11:
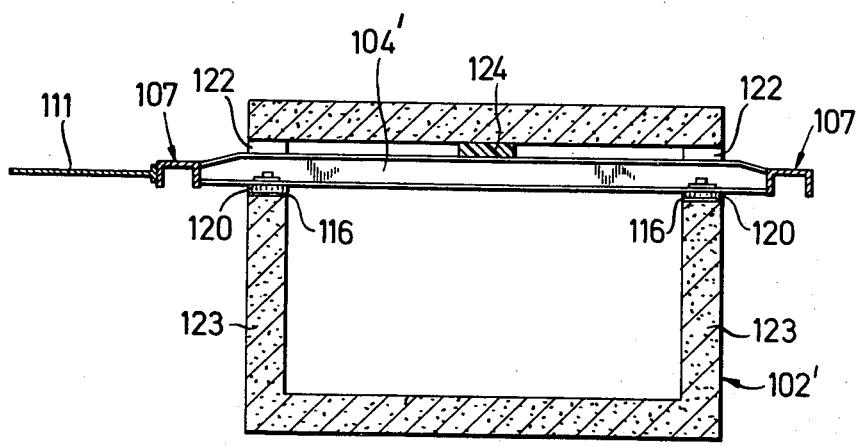
FIG. 11 is a view similar to FIG. 10 of another embodiment of the invention.

While FIGS. 8, 10 and 11 deal with magnetic suspension vehicles having a linear induction motor on only one side, it will be immediately apparent that a similar reaction rail can be provided in mirror-symmetrical relationship on the other side when two linear induction motors are employed. In addition, other rail components may be mounted upon the suspension and guide rails 107 as illustrated for example in FIGS. 2 and 3.

The brackets 104 are formed as double-T profile irons 112 (see FIG. 8A) whose outer limbs converge inwardly toward the shank 110 at which the armature rails 107 are welded to the brackets 104. The transverse legs 113 and 114 in the converging portion of member 112 can thus both be welded to the rail 107. The butt welding brings small areas of the bracket into juxtaposition with the armature rail so that the brackets have little, if any, effect on the magnetic load-supporting and guidance characteristics of the armature rails.

To secure the brackets 104 to the supports 102, each bracket 104 is used in conjunction with two anchor plates 116 embedded in the concrete body 102 and having an upper surface flush with the top of this support. Each anchor plate 116 provided with two bores 117 aligned in the direction of travel of the vehicle and only one of which can be seen in the drawing. On the underside of each anchor plate 116 in alignment with its bor 117, there is welded a cap nut 118 into which a bolt 121 may be threaded. The anchor plate 116 may be formed with dowels (not shown) extending into the concrete body and/or affixing the anchor plate to the reinforcing bars (FIGS. 1E and 1F) thereof. The two aligned bolts 121 can be seen in FIG. 8A.

Each of the brackets is formed with a pair of slots 19 enlarged in a direction parallel to the major dimension of the bracket and adapted to register with the holes 117 so that the bolts can be inserted. The slots allow adjustment of the brackets perpendicular to the longitudinal direction of the track.

Between each anchor plate 116 and the bracket 104, there is provided a layer 120 of synthetic-resin hard mortar or some other mortar having high compressive strength and filling the adjustment gap 25 when the latter has been set. The adjustment may be effected by packing mortar into the gap after the screw has been loosely inserted until the desired position of the bracket is reached, permitting the mortar to harden and then tightening the bolt. For readjustment, the mortar is broken away and the process repeated. The mortar is maintained under the loading stress and the bolt is generally relieved.

In FIG. 10, the system is shown as it applies to a central beam track in which the bracket 104' projects at oposite end beyond the lateral walls of the central beam. The rail components 105 can be mounted at either end and along the two vertical walls of the central beam, 102' the bracket 104' is supported as previously described.

Earlier diammetric Figures of the brackets may be eliminated when they are passed through openings 122 in the lateral walls 123 of the central support beam 102'', the brackets being affixed to the lateral walls 123 as previously described. In addition, the layer of mortar 124 is provided between the roof of the hollow body constituting the central beam 102'' to reduce bending upon loading of the outrigger portion of the bracket.

We claim:

1. A device for adjustably mounting a rail-carrying element having a lug member upon a support, especially in the track of a suspension vehicle, said device comprising a nut member anchored in said support, a pair of threadedly interconnected spacer sleeves interposed between said support and said lug member, and a bolt traversing said lug member and said pair of spacer sleeves engaging said nut member, while having a head member adapted to clamp said lug member against said pair of spacer sleeves and said sleeves against said support, one of said sleeves being formed with a generally spheroidal surface and a disk with a complementary spheroidal surface is interposed between said one of said sleeves and an adjoining member for enabling angular positioning of said lug member with two degrees of freedom relative to said support.

* * * * *